US011586879B2

(12) United States Patent
Govea et al.

(10) Patent No.: US 11,586,879 B2
(45) Date of Patent: *Feb. 21, 2023

(54) SYSTEMS AND METHODS FOR MODULATION CLASSIFICATION OF BASEBAND SIGNALS USING MULTIPLE DATA REPRESENTATIONS OF SIGNAL SAMPLES

(71) Applicant: Motorola Solutions, Inc., Chicago, IL (US)

(72) Inventors: Stephen J. Govea, Schaumburg, IL (US); Nathanael P. Kuehner, Rolling Meadows, IL (US); David N. Taylor, West Dundee, IL (US); Rodger W. Caruthers, Des Plaines, IL (US); Micah D. Silberstein, Highland Park, IL (US); Gregory Agami, Arlington Heights, IL (US)

(73) Assignee: Motorola Solutions, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/751,194

(22) Filed: May 23, 2022

(65) Prior Publication Data

US 2022/0284270 A1  Sep. 8, 2022

Related U.S. Application Data

(63) Continuation of application No. 16/382,912, filed on Apr. 12, 2019, now Pat. No. 11,443,167.

(51) Int. Cl.
*G06N 3/04* (2006.01)
*H04L 27/36* (2006.01)
(Continued)

(52) U.S. Cl.
CPC ........... *G06N 3/0454* (2013.01); *H04L 27/12* (2013.01); *H04L 27/14* (2013.01);
(Continued)

(58) Field of Classification Search
CPC ....... G06N 3/0454; H04L 27/12; H04L 27/14; H04L 27/22; H04L 27/20; H04L 27/36; H04L 27/38; H04L 27/2003
(Continued)

(56) References Cited

U.S. PATENT DOCUMENTS 10,003,483 B1 * 6/2018 Migliori .............. H04L 27/0012
2019/0319659 A1 * 10/2019 Calabro ................. H04B 1/04

OTHER PUBLICATIONS

Nathan West et al., "Deep Architectures for Modulation Recognition", Presented at IEEE DySPAN 2017, Mar 6. 2017, 13 pages.
(Continued)

*Primary Examiner* — Leila Malek
(74) *Attorney, Agent, or Firm* — Baker Botts L.L.P.; Michael A. Sartori

(57) ABSTRACT

Systems and methods for classifying radio frequency signal modulations include receiving, at a consolidated neural network, a complex quadrature vector of interest representative of a baseband signal derived from a radio frequency signal, generating multiple data representations of the vector of interest, providing each data representation to one of multiple parallel neural networks in the consolidated neural network, and receiving, from the consolidated neural network, a classification result for the baseband signal. The consolidated neural network may be trained to classify baseband signals with respect to known modulation types by receiving complex quadrature training vectors, each including samples of a baseband signal derived from a radio frequency signal of known modulation type, comparing a classification result for the training vector to the known modulation type to determine modulation classification per-
(Continued)

formance, and modifying a configuration parameter of the consolidated neural network dependent on the determined modulation classification performance.

20 Claims, 7 Drawing Sheets

(51) Int. Cl.
    *H04L 27/22*    (2006.01)
    *H04L 27/14*    (2006.01)
    *H04L 27/20*    (2006.01)
    *H04L 27/12*    (2006.01)
(52) U.S. Cl.
    CPC .......... *H04L 27/2003* (2013.01); *H04L 27/22* (2013.01); *H04L 27/36* (2013.01)
(58) Field of Classification Search
    USPC .......................................................... 706/15
    See application file for complete search history.

(56) References Cited

OTHER PUBLICATIONS

Timothy James O'Shea et al., "Over-the-Air Deep Learning Based Radio Signal Classifcation", IEEE Journal of Selected Topics in Signal Processing, vol. 12, No. 1, Feb. 2018, 12 pages.
Steven C. Hauser et al., "Signal Detection Effects on Deep Neural Networks Utilizing Raw IQ for Modulation Classification", Milcom 2017 Track 5, IEEE, 7 pages.
Shengliang Peng et al., "Modulation Classification Based on Signal Constellation Diagrams and Deep Learning", IEEE Transactions on Neural Networks and Learning Systems, vol. 30, No. 3, 10 pages, Date of Publication: Jul. 24, 2018.
William A. Gardner et al., "Signal Interception: Performance Advantages of Cyclic-Feature Detectors" IEEE Transactions on Communications, vol. 40, No. 1, Jan. 1992, pp. 149-159.

* cited by examiner

SYSTEMS AND METHODS FOR MODULATION CLASSIFICATION OF BASEBAND SIGNALS USING MULTIPLE DATA REPRESENTATIONS OF SIGNAL SAMPLES

BENEFIT CLAIM

This application claims the benefit under 35 U.S.C. § 120 as a continuation of U.S. patent application Ser. No. 16/382,912 filed Apr. 12, 2019, the entire contents of which is hereby incorporated by reference as if fully set forth herein. Applicant hereby rescinds any disclaimer of claim scope in the application(s) of which the benefit is claimed and advises the USPTO that the present claims may be broader than any application(s) of which the benefit is claimed.

BACKGROUND OF THE INVENTION

Radio Frequency (RF) communication systems pervade the modern world, connecting an ever-growing array of devices and services for a variety of consumer, industrial, and defense applications. RF signal quality degrades in real-world communication channels through a variety of effects, such as multipath effects, co-channel interference, fading, transmission distance, and environmental noise. Traditionally, radio signal classification has relied on hand-crafted, expert features and a priori knowledge about the types of radio hardware and modulations expected in a given environment. The proliferation of legacy and new RF communication standards, along with the adoption of frequency and modulation-agile Software Defined Radio (SDR) technology, allows communications systems to support a broad frequency range and modulation library, even on commodity level hardware. The resulting complexity in the electromagnetic spectrum makes labor intensive analysis systems unsustainable.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
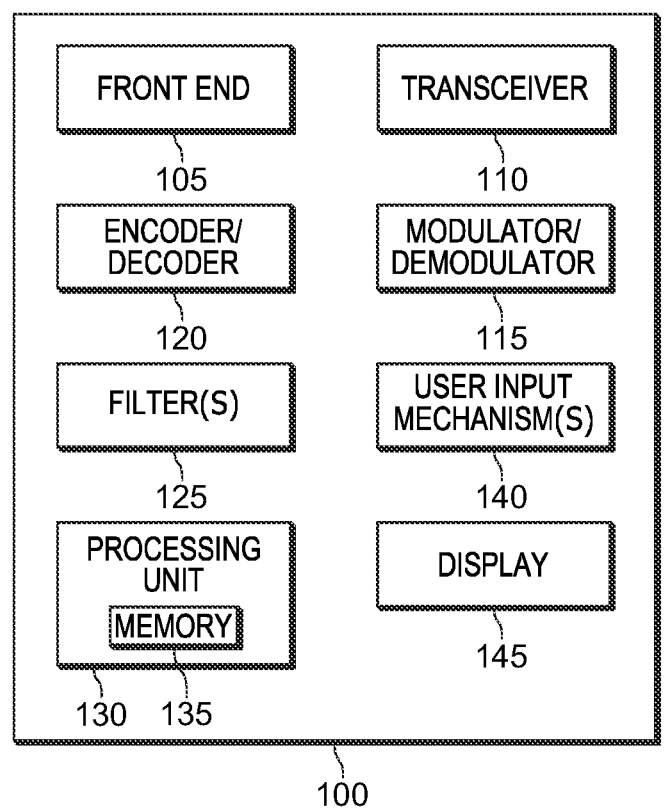
FIG. 1 is a block diagram illustrating selected elements of a system for classifying baseband signals derived from radio frequency signals with respect to modulation type, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are systems and methods for classifying baseband signals derived from radio frequency signals with respect to modulation type using multiple data representations of baseband signal samples. In one embodiment, a disclosed method includes receiving, at a consolidated neural network whose objective is modulation classification performance, a complex quadrature vector of interest including a plurality of samples of a baseband signal derived from a radio frequency signal of an unknown modulation type. Each sample includes real and imaginary parts of the baseband signal of the unknown modulation type in the complex plane. The method also includes generating a plurality of different data representations of the complex quadrature vector of interest, providing each data representation of the complex quadrature vector of interest to a respective one of a plurality of parallel neural networks of the consolidated neural network, and receiving, from the consolidated neural network, a classification result for the baseband signal derived from the radio frequency signal of the unknown modulation type.

In one embodiment, a disclosed system includes a consolidated neural network whose objective is modulation classification performance and a pre-processing stage. The consolidated neural network includes a plurality of parallel neural networks. The pre-processing stage is configured to receive a complex quadrature vector of interest including a plurality of samples of a baseband signal derived from a radio frequency signal of an unknown modulation type. Each sample includes real and imaginary parts of the baseband signal of the unknown modulation type in the complex plane. The pre-processing stage is further configured to generate a plurality of different data representations of the complex quadrature vector of interest and provide each data representation of the complex quadrature vector of interest to a respective one of the plurality of parallel neural networks of the consolidated neural network. The consolidated neural network is configured to generate, dependent on the data representations of the complex quadrature vector of interest provided to the respective ones of the plurality of parallel neural networks, a classification result for the baseband signal derived from the radio frequency signal of the unknown modulation type. The classification result includes a final output vector in which each element indicates a probability that the unknown modulation type is a respective one of the known modulation types.

In at least some embodiments, prior to receiving the complex quadrature vector of interest, the consolidated neural network may be trained to classify baseband signals derived from radio frequency signals with respect to a plurality of known modulation types. The training may include receiving a plurality of complex quadrature training vectors, each of which includes a plurality of samples of a baseband signal derived from a radio frequency signal of a respective one of the plurality of known modulation types. The training may also include, for each of the complex quadrature training vectors, generating a plurality of different data representations of the complex quadrature training vector, providing each data representation of the complex quadrature training vector to a respective one of the plurality of parallel neural networks of the consolidated neural network, receiving, as an output of the consolidated neural network, a classification result for the complex quadrature training vector with respect to the plurality of known modulation types, comparing the classification result for the complex quadrature training vector with the known modulation type of the baseband signal for which a plurality of samples is included in the complex quadrature training vector, determining modulation classification performance of the consolidated neural network dependent on the comparison, and modifying a configuration parameter of the consolidated neural network dependent on the determined modulation classification performance.

In various embodiments, the different data representations may include an averaged Power Spectral Density (PSD) representation, a spectrogram PSD representation, an eye diagram representation, a phase representation, a phase differentiation representation, or an autocorrelation representation.

In at least some embodiments, each of the plurality of parallel neural networks of the consolidated neural network may include one or more of a residual neural network, a convolutional layer, a pooling layer, and a fully connected layer.

In some embodiments, each of the plurality of parallel neural networks of the consolidated neural network may output a respective constituent output vector in which each element of the constituent output vector indicates a probability that the unknown modulation type is a respective one of the known modulation types, and the constituent output vectors may be combined to generate the final output vector. Combining the constituent output vectors to generate the final output vector may include applying a respective weight to each of the constituent output vectors.

In some embodiments, each of the plurality of parallel neural networks of the consolidated neural network may output a respective intermediate output characterizing the baseband signal derived from the radio frequency signal of the unknown modulation type, and the final output vector may be generated dependent on the intermediate outputs.

In some embodiments, each data representation of the complex quadrature vector of interest may be provided to a respective one of a plurality of individual neural networks of an ensemble neural network. The ensemble neural network may include the plurality of individual neural networks and the consolidated neural network. Each of the plurality of individual neural networks of the ensemble neural network may output a respective constituent output vector in which each element of the constituent output vector indicates a probability that the unknown modulation type is a respective one of the known modulation types. The constituent output vectors and the consolidated output vector may be combined to generate the final output vector.

In some embodiments, the complex quadrature vector of interest may be filtered prior to generating the plurality of different data representations of the complex quadrature vector of interest.

In some embodiments, generating the plurality of different data representations of the complex quadrature vector of interest may include applying, to the complex quadrature vector of interest, a domain-specific transformation.

The systems and methods described herein for modulation classification of baseband signals derived from radio frequency signals in which multiple data representations are input to a deep neural network may exhibit improved modulation classification performance compared to existing systems in which individual data representations are used. The systems and methods described herein may be trained to determine which different data representations, and which combinations of the outputs of the parallel neural networks to which they are input, lead to a desired level of modulation classification performance.

FIG. 1 is a block diagram illustrating selected elements of a system 100 for classifying baseband signals derived from radio frequency signals with respect to modulation type using multiple data representations of baseband signal samples, in accordance with some embodiments. The illustrated components of FIG. 1, along with other various modules and components, may be coupled to each other by or through one or more control or data buses that enable communication between them. The use of control and data buses for the interconnection between and exchange of information among the various modules and components would be apparent to a person skilled in the art in view of the description provided herein. In various embodiments, system 100 may be, or be a component of, a base station, a mobile station, or another device configured to receive and, in some cases, transmit baseband signals derived from radio frequency signals, or radio frequency signals from which baseband signals are derived, and to classify baseband signals with respect to modulation type. In some embodiments, system 100 may be integrated with an electronic communications device, for example, a portable radio, a cellular telephone, a tablet computer, and the like.

In the illustrated embodiment, system 100 includes a front end 105, a transceiver 110, an encoder/decoder 120, a modulator/demodulator 115, one or more filters 125, a modulation classification processing unit 130, which includes memory 135, one or more user input mechanisms 140, and a display 145. In other embodiments, system 100 may include more, fewer, or different elements than those illustrated in FIG. 1.

The front end 105 may include various digital and analog components, which for brevity are not described herein and which may be implemented in hardware, software, or a combination of both, including one or more radio frequency filters, signal splitters, signal switches, signal combiners, transmit power amplifiers, and the like (not shown). The front end 105 may include one or more wired or wireless input/output (I/O) interfaces configurable to communicate with base stations, mobile stations, or other devices configured to receive and, in some cases, transmit baseband signals derived from radio frequency signals or radio frequency signals from which baseband signals are derived. In at least some embodiments, the front end 105 may receive radio frequency signals from an antenna communicatively coupled to the front end 105 (not shown), optionally filter the signals, and pass them to the transceiver 110. Likewise, the front end 105 may receive radio frequency signals from the transceiver 110, optionally filter the signals, and transmit them via the antenna.

In various embodiments, transceiver 110 may be or include a wireless transceiver such as a DMR transceiver, a P25 transceiver, a Bluetooth transceiver, a Wi-Fi transceiver perhaps operating in accordance with an IEEE 802.11 standard, such as 802.11a, 802.11b, or 802.11g, a WiMAX transceiver perhaps operating in accordance with an IEEE 802.16 standard, an LTE transceiver, or another similar type of wireless transceiver configurable to communicate via a wireless radio network. In some embodiments, transceiver 110 may be or include one or more wireline transceivers 110, such as an Ethernet transceiver, a Universal Serial Bus (USB) transceiver, or similar transceiver configurable to communicate via a twisted pair wire, a coaxial cable, a fiber-optic link or a similar physical connection to a wireline network. In various embodiments, transceiver 110 may be or include a software defined transceiver implemented using a frequency and modulation-agile Software Defined Radio (SDR) technology. The transceiver 110 may be coupled to combined modulator/demodulator 115, which is coupled to encoder/decoder 120.

In the illustrated embodiment, the transceiver 110 receives modulated radio frequency signals, e.g., a carrier frequency signal modulated with a baseband signal, from an antenna via the front end 105. The radio frequency signals may be modulated using any of a variety of modulation types and formats, in different embodiments and at different times. Modulator/demodulator 115 extracts and demodulates the in-phase and quadrature baseband signals from the received modulated radiofrequency signal. The transceiver 110 may communicate the demodulated baseband signals to encoder/decoder 120, which decodes the signals to extract data encoded in the signals. Modulator/demodulator 115 may receive a baseband signal encoded with data by encoder/decoder 120 and modulate the baseband signal with a carrier signal to produce a modulated radio frequency signal. The transceiver 110 transmits the modulated radio frequency signal via the front end 105 and the antenna.

The modulation classification processing unit 130 may include a microprocessor configured to execute program instructions that implement a consolidated neural network trained for classifying baseband signals derived from radio frequency signals with respect to modulation type using multiple data representations of baseband signal samples. In some embodiments, the modulation classification processing unit 130 may include a graphics processing unit (GPU) configured to perform certain aspects of a method for classifying baseband signals derived from radio frequency signals with respect to modulation type or a method for training a neural network to perform such classifications. Other program instructions, when executed by the microprocessor, may perform training the consolidated neural network for classifying baseband signals derived from radio frequency signals with respect to modulation type using multiple data representations of baseband signal samples. For example, memory 135 may include a Read Only Memory (ROM) and a Random Access Memory (RAM) for storing, at various times, program instructions and data for performing some or all of the modulation classification and neural network training steps set forth in FIGS. 4 and 5 and the accompanying text. In some embodiments, memory 135 may also store program instructions and data for initializing system components, encoding and decoding voice, data, control, or other signals that may be transmitted or received between system 100 and one or more base stations or mobile stations (not shown). In some embodiments, some or all of the functionality of encoder/decoder 120 or of other elements of system 100 shown in FIG. 1 may be implemented by program instructions executed by the microprocessor of classification processing unit 130 or another processing unit (not shown).

User input mechanisms 140 may include any of a variety of suitable mechanisms for receiving user input, such as for initializing and initiating a modulation classification exercise or for initializing and initiating an exercise to train a consolidated neural network for modulation classification, as described herein. Display 145 may include any suitable display technology for presenting information to a user including, for example, a modulation classification result. Each of the user input mechanisms 140 and display 145 may be communicatively coupled to the modulation classification processing unit 130.

In some embodiments, one or more filters 125 may be configured to pre-process baseband signals, or representations thereof, prior to providing them to modulation classification processing unit 130 for modulation classification.

A variety of defense and commercial applications rely on fast and accurate signal classification. As noted above, the proliferation of legacy and new RF communication standards, along with the adoption of SDR technology, has led to increased complexity in the electromagnetic spectrum making labor intensive analysis systems unsustainable. The systems and methods described herein may, in various embodiments, be used to detect and classify RF signals of interest using limited input data, Artificial Intelligence (AI) and Machine Learning (ML), enabling performance improvements over expert feature analysis methods and methods that rely on a single data representation of a signal of interest.

More specifically, the systems and methods described herein may use multiple data representations to capture expert features, along with raw or filtered IQ, as inputs to parallel neural networks to detect and classify RF modulations from baseband IQ data. In some embodiments, the data transformations to be applied to the raw or filtered IQ data prior to providing the resulting data representation to a respective one of multiple parallel neural networks may be identified based on domain-specific expertise. In some embodiments, the data transformations to be applied to the raw or filtered IQ data prior to providing the resulting data representation to a respective one of multiple parallel neural networks may learned during the training of a consolidated neural network, such as those described herein.

In some embodiments, a consolidated neural network may be trained to classify baseband signals derived from radio frequency signals with respect to a plurality of known modulation types. For example, in some embodiments, baseband signals derived from radio frequency signals may be classified by a consolidated neural network with respect to the following twenty-four modulation types: BPSK, QPSK, 8PSK, 16PSK, QAM16, QAM64, 2FSK_5 KHz, 2FSK_75 KHz, GFSK_75 KHz, GFSK_5 KHz, GMSK, MSK, CPFSK_75 KHz, CPFSK_5 KHz, APSK16_c34, APSK32_c34, QAM32, OQPSK, PI4QPSK, FM_NB, FM_WB, AM_DSM, AM_SSM, and NOISE. In other embodiments, a consolidated neural network may be trained for classifying baseband signals derived from radio frequency signals with respect to more, fewer, or different known modulation types.

In some embodiments, training a consolidated neural network for classifying baseband signals derived from radio frequency signals with respect to known modulation types may include adding Gaussian noise, at various levels, to degrade the signal-to-noise ratio associated with signal samples representing baseband signals of known modulation types. In some embodiments, training a consolidated neural network for classifying baseband signals derived from radio frequency signals with respect to known modulation types may include corrupting signal samples representing baseband signals of known modulation types, such as by injecting various RF channel effects into the sample data.

In at least some embodiments, the systems and methods described herein may integrate multiple signal representations as inputs to a consolidation neural network for modulation classification including, but limited to, various combinations of the following representations: an averaged Power Spectral Density (PSD) representation, a spectrogram PSD, or waterfall, representation, a phase representation, a phase differentiation representation, an eye diagram representation, and an autocorrelation representation. Each data representation may be input to a respective one of multiple parallel neural networks in the consolidated neural network, and a final classification result may be dependent on intermediate outputs generated by the multiple parallel neural networks. The outputs from the parallel networks may be concatenated and fed into a common neural network to form a single trainable consolidated network. For example, the outputs from the parallel networks may be consolidated at an intermediate point to form the single trainable consolidated network.

In some embodiments, an ensemble neural network may be built in which individual classification results are generated by each of multiple individual neural networks that employ diverse models, each using either multiple data representations or a single data representation. The generated classification results may be combined using a weighted average across the models to generate a final classification result for the ensemble network.

Configuration information used in generating a final classification result by a consolidated neural network or an ensemble network may, in various embodiments, include information indicating the number of different data representations used in a classification or training exercise, the specific combinations of data representations to be used in a classification or training exercise, weightings on the respective outputs of parallel neural networks in the consolidated neural network or ensemble neural network, or the number, type, or configuration of neural network layers or other elements included in each of the parallel neural networks in the consolidated neural network or ensemble neural network. Certain elements of this configuration information may, in various embodiments and at different times, represent initial, default, or learned configuration information for the consolidated neural network or ensemble neural network.

In various embodiments, the systems and methods described herein may be used in an application in which the RF spectrum is surveyed to identify transmitted signals and if, based on a baseband IQ vector of what may be relatively noisy signal samples, a modulated signal is detected, the signal is classified with respect to multiple known modulation types.

Figure 2:
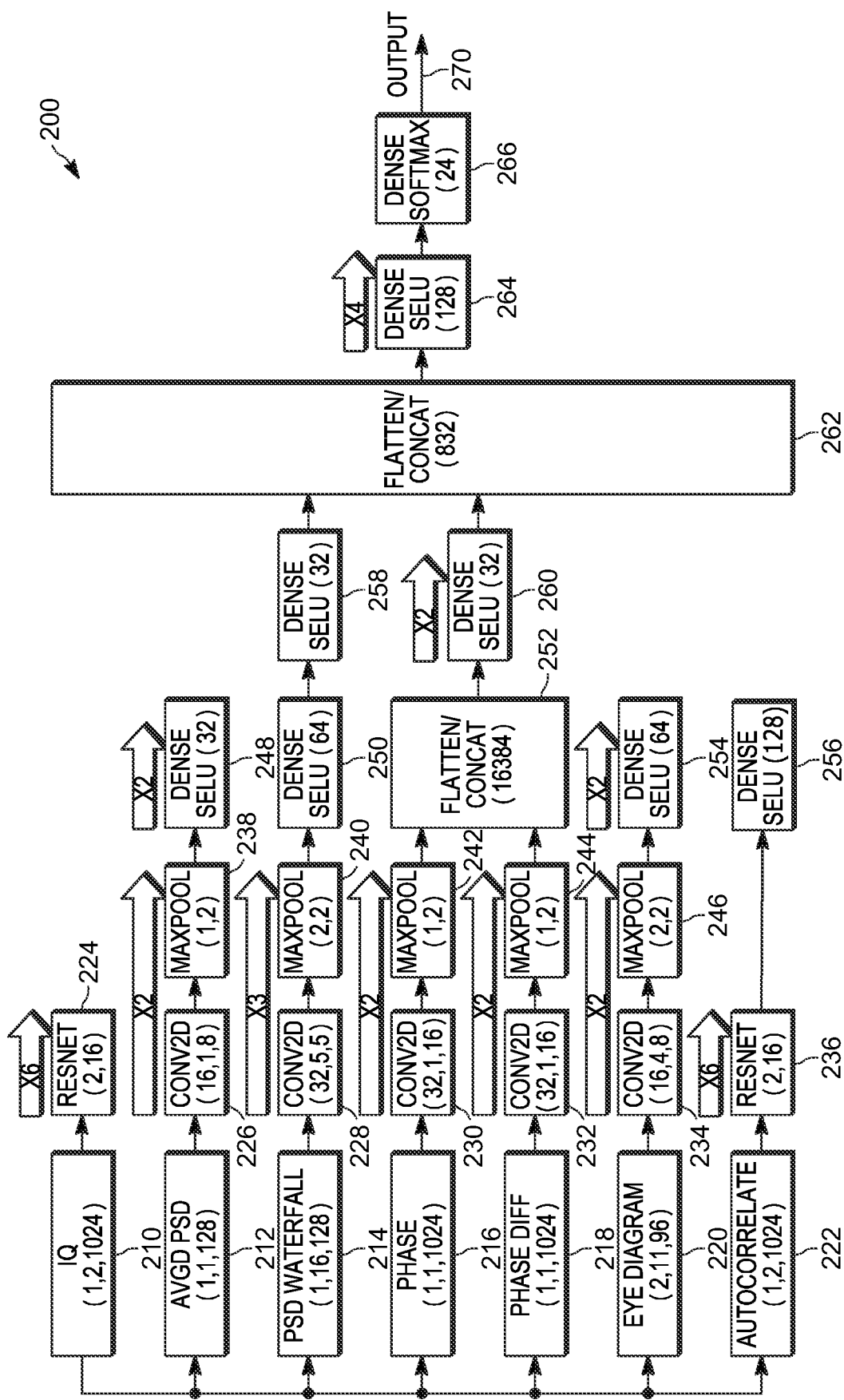
FIG. 2 is a block diagram illustrating selected elements of a consolidated neural network, in accordance with some embodiments.

FIG. 2 is a block diagram illustrating selected elements of a consolidated neural network 200, in accordance with some embodiments. In the illustrated embodiment, consolidated neural network 200 receives a complex quadrature vector of interest 210 including a plurality of samples of a baseband signal derived from a radio frequency signal of an unknown modulation type. The complex quadrature vector of interest 210 may be a raw or filtered IQ vector representation of the baseband signal including 1024 samples. Each sample includes real (I) and imaginary (Q) parts of the baseband signal of the unknown modulation type in the complex plane. In the illustrated embodiment, output 270 represents a prediction of the modulation type for the baseband signal represented by complex quadrature vector of interest 210. For example, the output 270 of consolidated neural network 200 may be a classification result including a final output vector in which each element of the final output vector indicates a probability that the unknown modulation type is a respective one of multiple known modulation types on which the consolidated neural network 200 has been trained, or on which the consolidated neural network 200 is being trained.

In the illustrated example, each of the elements 212 through 222 of consolidated neural network 200 represents a respective data representation generated from the complex quadrature vector of interest 210, including an averaged Power Spectral Density (PSD) representation 212, a spectrogram PSD, or waterfall, representation 214, a phase representation 216, a phase differentiation representation 218, an eye diagram representation 220, and an autocorrelation representation 222.

Generating the averaged PSD representation may include converting the raw or filtered IQ vector input into a more compressed form. Similarly, generating the eye diagram representation may include reformatting of the raw or filtered IQ vector input. The spectrogram PSD representation may indicate signal amplitude or strength displayed over time and across a range of frequencies. The raw or filtered IQ vector inputs are represented by complex numbers. Generating a phase representation from an IQ vector may therefore include computing an angle from a complex number, which may be similar to a conversion to a polar coordinate. Generating the differential phase representation may include taking the derivative of the phase function over time, which may be similar to an FM demodulation effect. The autocorrelation representation may indicate the relationships between raw or filtered IQ vector input values over time.

In the illustrated embodiment, consolidated neural network 200 includes seven parallel neural networks, each of which operates on a respective one of the data representations shown as elements 212 through 222, and each comprising one or more of a residual neural network, a convolutional layer, a pooling layer, and a fully connected layer, in various combinations. For example, a first one of the parallel neural networks receives the 1×2×1024 raw or filtered IQ representation 210 as input. This first neural network includes a stack of six 2×16 residual neural network elements shown as ResNet 224. A second one of the parallel neural networks, which receives the 1×1×128 averaged Power Spectral Density (PSD) representation 212 as input, includes a 16×1×8 convolutional layer shown as Conv2D 226, a 1×2 pooling layer shown as MaxPool 238, and a fully connected layer that uses a scaled exponential linear unit (SeLu), shown as dense layer 248, to induce self-normalizing. Elements of the second neural network are replicated to handle both the real (I) and imaginary (Q) parts of the baseband signal. A third one of the parallel neural networks, which receives the 1×16×128 spectrogram PSD, or waterfall, representation 214 as input, includes a 35×5×5 convolutional layer shown as Conv2D 228, a 2×2 pooling layer shown as MaxPool 240, a first fully connected layer that uses a scaled exponential linear unit (SeLu), shown as dense layer 250, and a second fully connected layer that uses a scaled exponential linear unit (SeLu), shown as dense layer 258. Elements of the third neural network are replicated to handle real (I) and imaginary (Q) parts of the baseband signal.

In the illustrated embodiment, a fourth one of the parallel neural networks, which receives the 1×1×1024 phase representation 216 as input, includes a 32×1×16 convolutional layer shown as Conv2D 230, and a 1×2 pooling layer shown as MaxPool 242. Elements of the fourth neural network are replicated to handle both the real (I) and imaginary (Q) parts of the baseband signal. A fifth one of the parallel neural networks, which receives the 1×1×1024 phase differentiation representation 218 as input, also includes a 32×1×16 convolutional layer shown as Conv2D 232, and a 1×2 pooling layer shown as MaxPool 244. Elements of the fifth neural network are replicated to handle both the real (I) and imaginary (Q) parts of the baseband signal. In the illustrated embodiment, intermediate outputs of the fourth and fifth neural networks are provided to a 16384-element concatenation layer, shown as flatten/concat element 252, the output of which is then provided to a fully connected layer that uses a scaled exponential linear unit (SeLu), shown as dense layer 260, to induce self-normalizing.

In the illustrated embodiment, a sixth one of the parallel neural networks, which receives the 2×11×96 eye diagram representation 220 as input, includes a 16×4×8 convolutional layer shown as Conv2D 234, a 2×2 pooling layer shown as MaxPool 246, and a fully connected layer that uses a scaled exponential linear unit (SeLu), shown as dense layer 254. Elements of the sixth neural network are replicated to handle both the real (I) and imaginary (Q) parts of the baseband signal. A seventh one of the parallel neural networks, which receives the 1×2×1024 autocorrelation representation 222 as input, includes a stack of six 2×16 residual neural network elements shown as ResNet 236, and a fully connected layer that uses a scaled exponential linear unit (SeLu), shown as dense layer 256, to induce self-normalizing.

In the illustrated embodiment, outputs of ResNet 224 and dense layers 248, 258, 260, 254, and 256 are provided to an 832-element concatenation layer, shown as flatten/concat element 262. The output of flatten/concat element 262 is then provided to a fully connected layer, shown as dense layer 264, that uses four scaled exponential linear units (SeLus), to induce self-normalizing. The output of dense layer 264 is provided to a fully connected layer, shown as SoftMax 266, that converts it into a probability distribution. The output of SoftMax 266 is output 270, which represents a prediction of the modulation type for the baseband signal represented by complex quadrature vector of interest 210, as described herein.

In the example embodiment illustrated in FIG. 2, each of the first, second, third, sixth and seventh ones of the parallel neural networks have different architectures than the other neural networks, while the architectures of the fourth and fifth ones of the parallel neural networks are similar but operate on different data representations. In other embodiments, more or fewer of the parallel neural networks of a consolidated neural network that operate on different data representations may have similar architectures. In some embodiments, all of the parallel neural networks of a consolidated neural network may have similar architectures but may operate on different data representations.

In the illustrated embodiment, each of the plurality of parallel neural networks of the consolidated neural network outputs a respective intermediate output characterizing the baseband signal derived from the radio frequency signal of the unknown modulation type, and the final output vector is generated dependent on the intermediate outputs. For example, each of the plurality of parallel neural networks may compute a feature map and the feature maps of each of the parallel neural networks may be combined in a non-linear fashion to produce the final output vector.

In some embodiments, the consolidated neural network may, using modulation classification performance as its objective, be trained to determine the respective weightings to be applied to the intermediate outputs of each of the parallel neural networks, rather than the weighting being programmed explicitly for the consolidated neural network. In some embodiments, a constraint on the network architecture, such as the number of data representations and corresponding parallel neural networks, may be set when initializing the training, and the consolidated neural network may learn to create the best set of weightings, in terms of modulation classification performance, given the inputs and the consolidated neural network architecture.

In some embodiments, an ensemble neural network for classifying a baseband signal with respect to modulation type may include multiple parallel neural networks, some of which operate on different data representations of the baseband signal. In some embodiments, an ensemble neural network may include multiple parallel neural networks that operate on a single data representation of a baseband signal. For example, multiple neural networks that receive a raw or filtered IQ representation of a baseband signal may be trained for modulation classification using different models. Each of those neural networks may output a classification result indicating, for each of multiple known modulation types, the probability that the modulation type for the baseband signal is that modulation type. A linear combination or averaging function may then be applied across the outputs to generate a final classification result. The initialization for each one of those neural networks, which might or might not have the same neural network architecture, may be random. Therefore, even if the architectures of all of the neural networks are the same, they may generate different classification results. The final classification result, generated using a linear combination or averaging function of the classification results generated by the individual neural networks, may represent a more accurate modulation predication than any of the individual classification results. In some embodiments, one of the neural networks in an ensemble neural network may be a consolidated network, such as consolidated neural network 200 illustrated in FIG. 2, and the output of the consolidated neural network may be combined with the output of the individual neural networks of the ensemble neural network to generate the final classification result.

Figure 3:
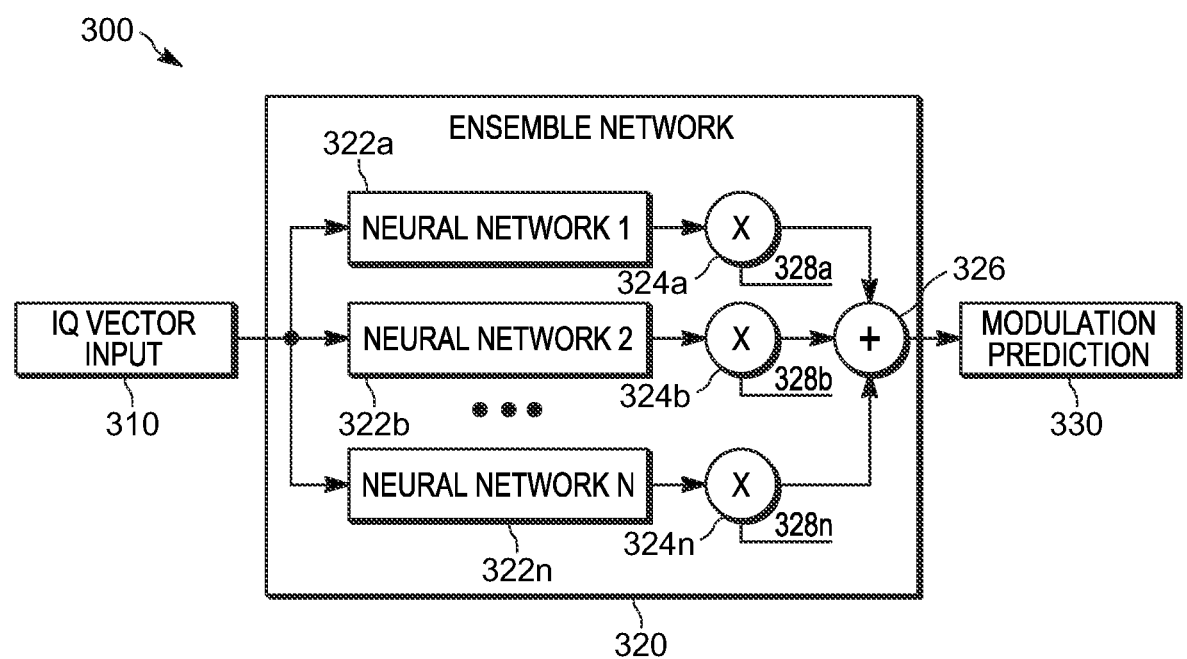
FIG. 3 is a block diagram illustrating selected elements of an ensemble neural network, in accordance with some embodiments.

FIG. 3 is a block diagram illustrating selected elements of an ensemble neural network, in accordance with some embodiments. In the illustrated embodiment, ensemble neural network 300 receives a complex quadrature vector input 310 including a plurality of samples of a baseband signal derived from a radio frequency signal of an unknown modulation type. The complex quadrature vector input 310 may be a raw or filtered IQ vector representation of the baseband signal including a plurality of signal samples. Each sample includes real (I) and imaginary (Q) parts of the baseband signal of the unknown modulation type in the complex plane. In the illustrated embodiment, the output of ensemble neural network 300 is a prediction of the modulation type for the baseband signal represented by complex quadrature vector input 310, shown as modulation prediction 330. For example, modulation prediction 330 may represent a classification result including a final output vector in which each element of the final output vector indicates a probability that the unknown modulation type is a respective one of multiple known modulation types on which the ensemble neural network 300 has been trained, or on which the consolidated neural network 300 is being trained.

In the illustrated embodiment, the raw or filtered IQ vector input 310 is provided to each of multiple individual neural networks 322. Each of these individual neural networks 322 generates a classification result. For example, each of the individual neural networks 322, such as 322a, 322b, and 322n, may be configured to output a respective constituent output vector in which each element of the constituent output vector indicates a probability that the unknown modulation type is a respective one of the known modulation types. The constituent output vectors are combined at summing element 326 to generate the final output vector, shown as modulation prediction 330. As illustrated in FIG. 3, in at least some embodiments, a respective weighting 328 may be applied to the output of each individual neural network 322 by a respective weighting element 324, after which the weighted outputs are combined at summing element 326 to generate the final output vector, shown as modulation prediction 330.

In some embodiments, each of the individual neural networks 322 may operate on a single data representation of the raw or filtered IQ vector input 310. In some embodiments, one of the individual neural networks 322, for example individual neural network 322a, may itself be a consolidated neural network, such as consolidated neural network 200 illustrated in FIG. 2, and the remaining individual neural networks 322, for example individual neural networks 322b through 322n, may each operate on a single data representation of the raw or filtered IQ vector input 310.

In the example embodiment illustrated in FIG. 3, in which one of the individual neural networks 322 is a consolidated neural network similar to consolidated neural network 200 illustrated in FIG. 2, a single data representation of the complex quadrature vector of interest or multiple data representations of the complex quadrature vector of interest may be provided to respective ones of a plurality of parallel neural networks of the consolidated neural network 322a. Each of the parallel neural networks of the consolidated neural network may output a respective intermediate output characterizing a baseband signal derived from a radio frequency signal of unknown modulation type, and a consolidated output vector in which each element of the consolidated output vector indicates a probability that the unknown modulation type is a respective one of multiple known modulation types may be generated dependent on the intermediate outputs. In the illustrated example, a single data representation of the complex quadrature vector of interest may be provided to each of the remaining individual neural networks of the ensemble neural network, shown as 322b through 322n, each of which outputs a respective constituent output vector in which each element of the constituent output vector indicates a probability that the unknown modulation type is a respective one of the known modulation types. The constituent output vectors and the consolidated output vector may then be combined, as shown in FIG. 3, to generate the final output vector, shown as modulation prediction 330.

Figure 4:
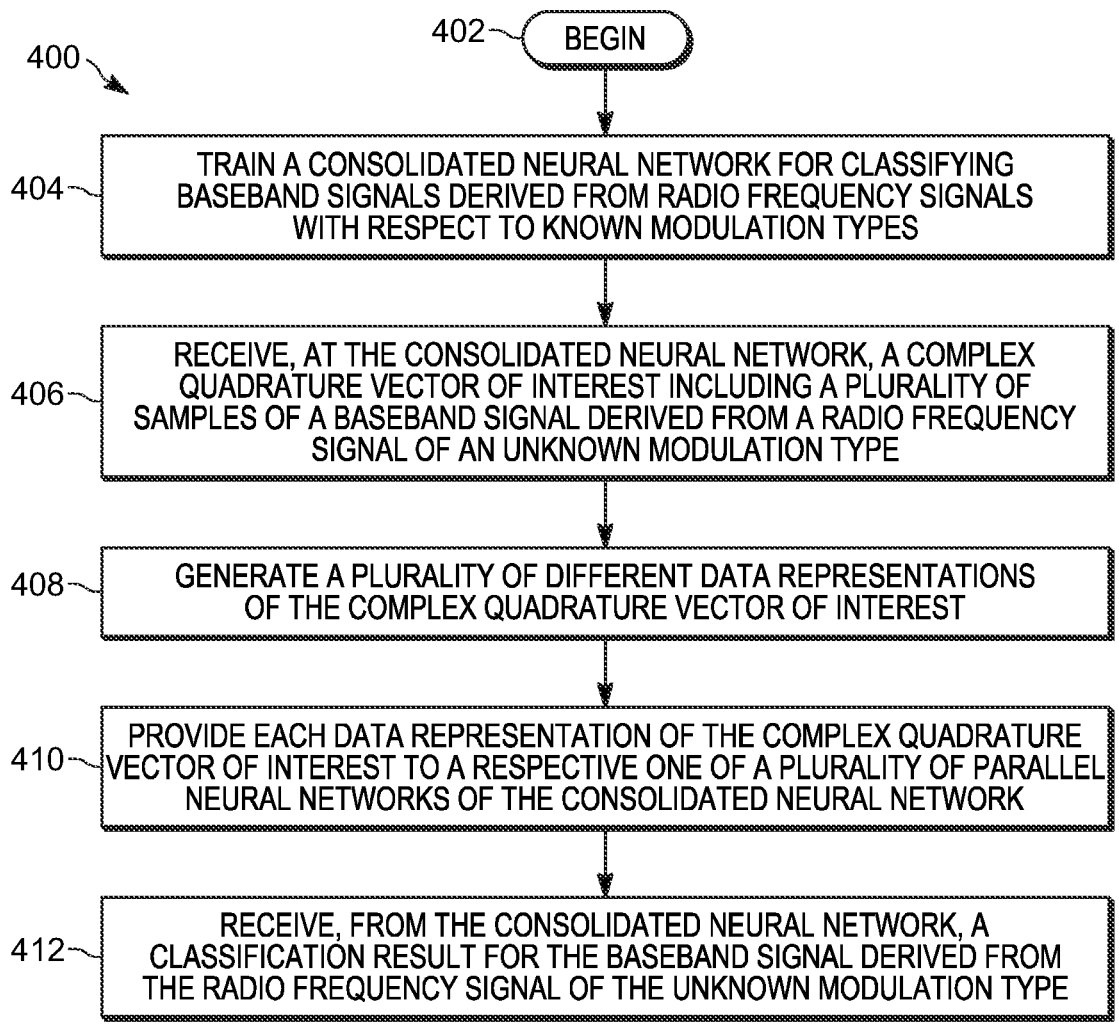
FIG. 4 is a flow diagram of selected elements of an example method for classifying baseband signals derived from radio frequency signals with respect to modulation type, in accordance with some embodiments.

Referring now to FIG. 4, there is provided a flow diagram of selected elements of an example method 400 for classifying baseband signals derived from radio frequency signals with respect to modulation type, in accordance with some embodiments. While a particular order of operations is indicated in FIG. 4 for illustrative purposes, the timing and ordering of such operations may vary where appropriate without negating the purpose and advantages of the examples set forth in detail throughout the remainder of this disclosure. In various embodiments, some or all of the operations of method 400 may be performed by a modulation classification processing unit within a base station, a mobile station, or another device configured to receive and, in some cases, transmit baseband signals, such as modulation classification processing unit 130 illustrated in FIG. 1 or modulation classification processing unit 700 illustrated in FIG. 7.

Figure 5:
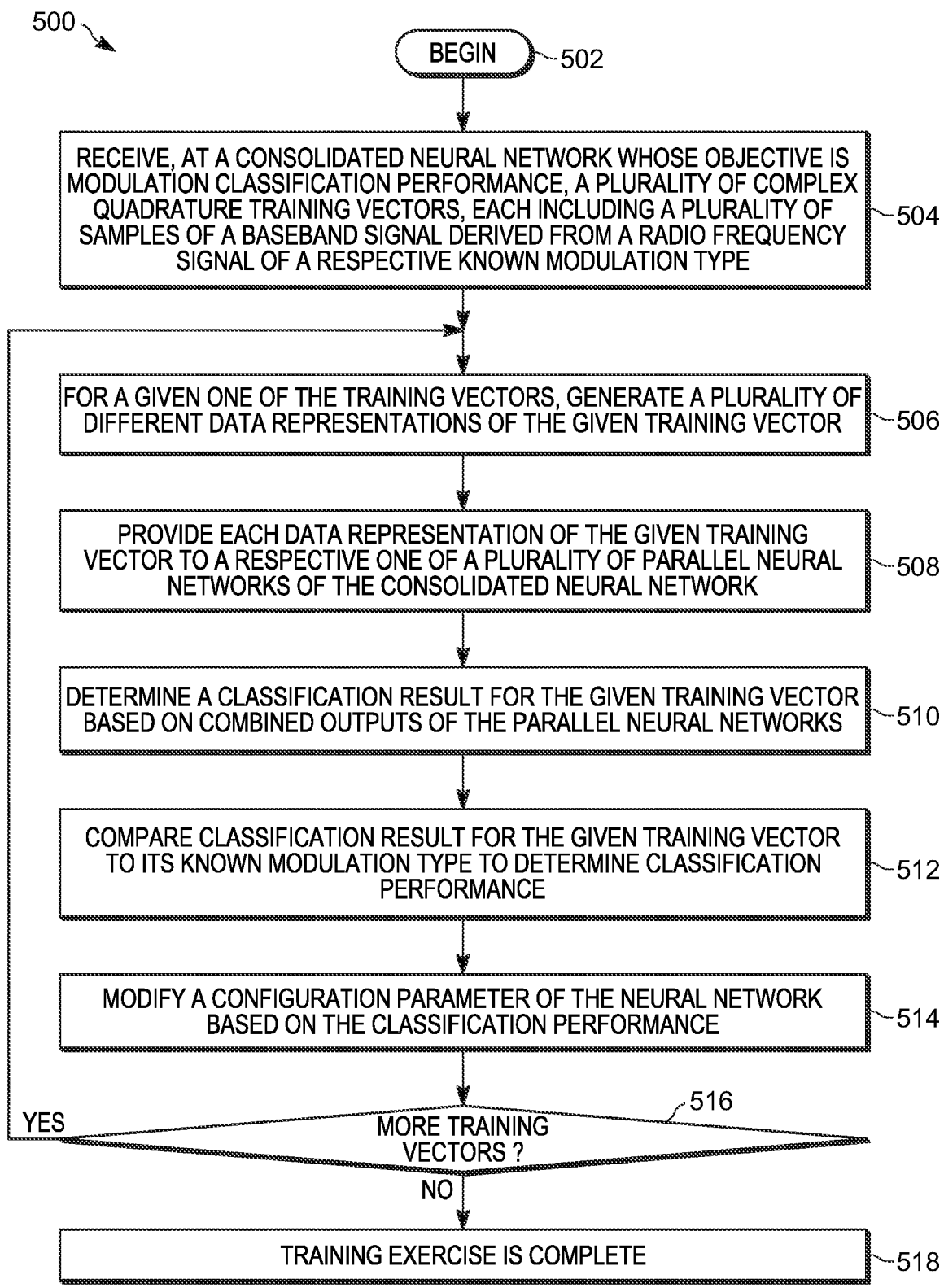
FIG. 5 is a flow diagram of selected elements of an example method for training a consolidated neural network for classifying baseband signals derived from radio frequency signals with respect to modulation type, in accordance with some embodiments.

In this example embodiment, method 400 begins with block 402 and continues with block 404, where a consolidated neural network is trained for classifying baseband signals derived from radio frequency signals with respect to known modulation types. The objective function for the consolidated neural network is modulation classification performance. One example method for training the consolidated neural network is illustrated in FIG. 5 and described below.

At 406, method 400 includes receiving, at the consolidated neural network, a complex quadrature vector of interest including a plurality of samples of a baseband signal derived from a radio frequency signal of an unknown modulation type. Each sample includes real (I) and imaginary (Q) parts of the baseband signal of the unknown modulation type in the complex plane.

At 408, the method includes generating a plurality of different data representations of the complex quadrature vector of interest. For example, the data representations may include any or all of an averaged Power Spectral Density (PSD) representation, a spectrogram PSD representation, an eye diagram representation, a phase representation, a phase differentiation representation, and an autocorrelation representation, in various combinations. In some embodiments, more, fewer, or different combinations of data representations may be generated than those generated in the example embodiments described herein. In at least some embodiments, generating the different data representations of the complex quadrature vector of interest may include applying, to the complex quadrature vector of interest, a domain-specific transformation. In some embodiments, the complex quadrature vector of interest may be filtered prior to generating the different data representations of the complex quadrature vector of interest.

At 410, method 400 includes providing each data representation of the complex quadrature vector of interest to a respective one of a plurality of parallel neural networks of the consolidated neural network. In various embodiments, each of the parallel neural networks of the consolidated neural network may include one or more of a residual neural network, a convolutional layer, a pooling layer, and a fully connected layer, in different combinations.

At 412, the method includes receiving, from the consolidated neural network, a classification result for the baseband signal derived from the radio frequency signal of the unknown modulation type. The classification result may include a final output vector in which each element of the final output vector indicates a probability that the unknown modulation type is a respective one of the known modulation types. In at least some embodiments, the classification result may be generated by combining the outputs of the parallel neural networks of the consolidated neural network. For example, each of the plurality of parallel neural networks may output a respective constituent output vector in which each element of the constituent output vector indicates a probability that the unknown modulation type is a respective one of the known modulation types, and the classification result may be generated by combining the constituent output vectors to produce the final output vector. Combining the constituent output vectors to generate the final output vector may include applying a respective weight to each of the constituent output vectors. In another example, each of the plurality of parallel neural networks may output a respective intermediate output characterizing the baseband signal derived from the radio frequency signal of the unknown modulation type, and the final output vector may be generated based on the intermediate outputs.

In at least some embodiments, some or all of the operations of method 400 illustrated in FIG. 4 may be repeated one or more times to classify subsequently received baseband signals derived from radio frequency signals with respect to modulation type using multiple data representations of baseband signal samples.

Referring now to FIG. 5, there is provided a flow diagram of selected elements of an example method 500 for training a consolidated neural network for classifying baseband signals derived from radio frequency signals with respect to modulation type, in accordance with some embodiments. While a particular order of operations is indicated in FIG. 5 for illustrative purposes, the timing and ordering of such operations may vary where appropriate without negating the purpose and advantages of the examples set forth in detail throughout the remainder of this disclosure. In various embodiments, some or all of the operations of method 500 may be performed by a modulation classification processing unit within a base station, a mobile station, or another device configured to receive and, in some cases, transmit baseband signals, such as modulation classification processing unit 130 illustrated in FIG. 1 or modulation classification processing unit 700 illustrated in FIG. 7.

In this example embodiment, method 500 begins with block 502 and continues with block 504, where a plurality of complex quadrature training vectors is received at a consolidated neural network whose objective is modulation classification performance. Each of the complex quadrature training vectors may include a plurality of samples of a baseband signal derived from a radio frequency signal of a respective known modulation type on which the consolidated neural network is to be trained. For example, in some embodiments, the known modulation types on which the consolidated neural network is to be trained may include any of all of the following: BPSK, QPSK, 8PSK, 16PSK, QAM16, QAM64, 2FSK_5 KHz, 2FSK_75 KHz, GFSK_75 KHz, GFSK_5 KHz, GMSK, MSK, CPFSK_75 KHz, CPFSK_5 KHz, APSK16 c34, APSK32 c34, QAM32, OQPSK, PI4QPSK, FM_NB, FM_WB, AM_DSM, and AM_SSM. In some embodiments, in addition to the known modulation types, the consolidated neural network may also be trained to classify a baseband signal derived from a radio frequency signal with respect to noise. Each signal sample may include real (I) and imaginary (Q) parts of the baseband signal of the known modulation type in the complex plane. In some embodiments, training the consolidated neural network for classifying baseband signals derived from radio frequency signals with respect to modulation type may include adding Gaussian noise, at various levels, to the samples to degrade the signal-to-noise ratio. In some embodiments, the complex quadrature training vectors used in the training may be corrupted by introducing other real-world RF channel effects into some or all of the samples.

At 506, method 500 includes, for a given one of the complex quadrature training vectors, generating a plurality of different data representations of the given training vector. For example, the data representations may include an averaged Power Spectral Density (PSD) representation, a spectrogram PSD representation, an eye diagram representation, a phase representation, a phase differentiation representation, or an autocorrelation representation, in various embodiments. Generating the different data representations may include applying, to the given complex quadrature training vector, a domain-specific transformation. In some embodiments, the method may include filtering the given complex quadrature training vector prior to generating the different data representations of the given complex quadrature training vector.

At 508, the method includes providing each data representation of the given training vector to a respective one of a plurality of parallel neural networks of the consolidated neural network. In various embodiments, each of the parallel neural networks of the consolidated neural network may include one or more of a residual neural network, a convolutional layer, a pooling layer, and a fully connected layer, in different combinations.

At 510, method 500 includes determining a classification result for the given training vector based on the combined outputs of the parallel neural networks. The classification result for the baseband signal derived from the radio frequency signal of the unknown modulation type may include a final output vector in which each element of the final output vector indicates a probability that the unknown modulation type is a respective one of the known modulation types. In some embodiments, each of the parallel neural networks may output a respective constituent output vector in which each element of the constituent output vector indicates a probability that the given training vector is associated with a baseband signal of a respective one of the known modulation types, and the classification result may be generated by combining the constituent output vectors to produce the final output vector. Combining the constituent output vectors to generate the final output vector may include applying a respective weight to each of the constituent output vectors. In some embodiments, each of the parallel neural networks may output a respective intermediate output characterizing the baseband signal derived from the radio frequency signal of the known modulation type, and the final output vector may be generated based on the intermediate outputs.

At 512, the method includes comparing the classification result for the given training vector to the known modulation type of the corresponding baseband signal to determine modulation classification performance for the consolidated neural network.

At 514, method 500 includes modifying a configuration parameter of the neural network based on the determined classification performance. Modifying a configuration parameter may include, for example, changing the number of different data representations used in the classification, selecting a different combination of data representations to be used in the classification, changing a weighting on an output of one of the plurality of parallel neural networks, or changing the number, type, or configuration of neural network layers or other elements included in one of the plurality of parallel neural networks.

If, at 516, there are additional complex quadrature training vectors to be considered, method 500 may return to 506, after which the operations shown as 506 through 514 may be repeated for each additional complex quadrature training vector. Otherwise, the training exercise may be complete, as shown at 518.

In at least some embodiments, some or all of the operations of method 500 illustrated in FIG. 5 may be repeated one or more times to train, retrain, or improve the modulation classification performance of the consolidated neural network as additional complex quadrature training vectors for baseband signals of the same or different known modulation types become available or in response to determining that the modulation classification performance does not yet meet a desired performance target.

The performance of the techniques described herein for classifying baseband signals derived from radio frequency signals with respect to modulation type using multiple data representations of baseband signal samples has been evaluated through various experiments. Through these experiments, the use of different data representations and combinations of data representations as inputs to deep neural networks, such as the consolidated neural networks described herein, was investigated. For example, confusion matrices and other graphical representations were generated to visualize classification performance with respect to specific modulation types and to determine which data representations and corresponding neural network architectures yielded more accurate predictions of modulation type in certain applications. Using confusion matrices, in which any point that deviated from a diagonal line on which the actual and predicted modulation types are the same is a false detection, modulation classification performance was evaluated for signals with varying levels of signal quality. The confusion matrices showed that, across modulation types, classification performance was typically much higher for higher quality input signals, such as those with a 10 dB signal-to-noise ratio, than for lower quality input signals, such as those with a −10 dB signal-to-noise ratio. The confusion matrices also illustrated that, although neural networks whose inputs included particular individual data representations were better at predicting modulation type than neural networks whose inputs included other data representations, for low quality input signals, there was a marked improvement in modulation classification performance across modulation types when multiple data representations were input to a consolidated neural network case. The confusion matrices also illustrated an improvement in modulation classification performance for high quality input signals, although the differences were not as dramatic.

Figure 6:
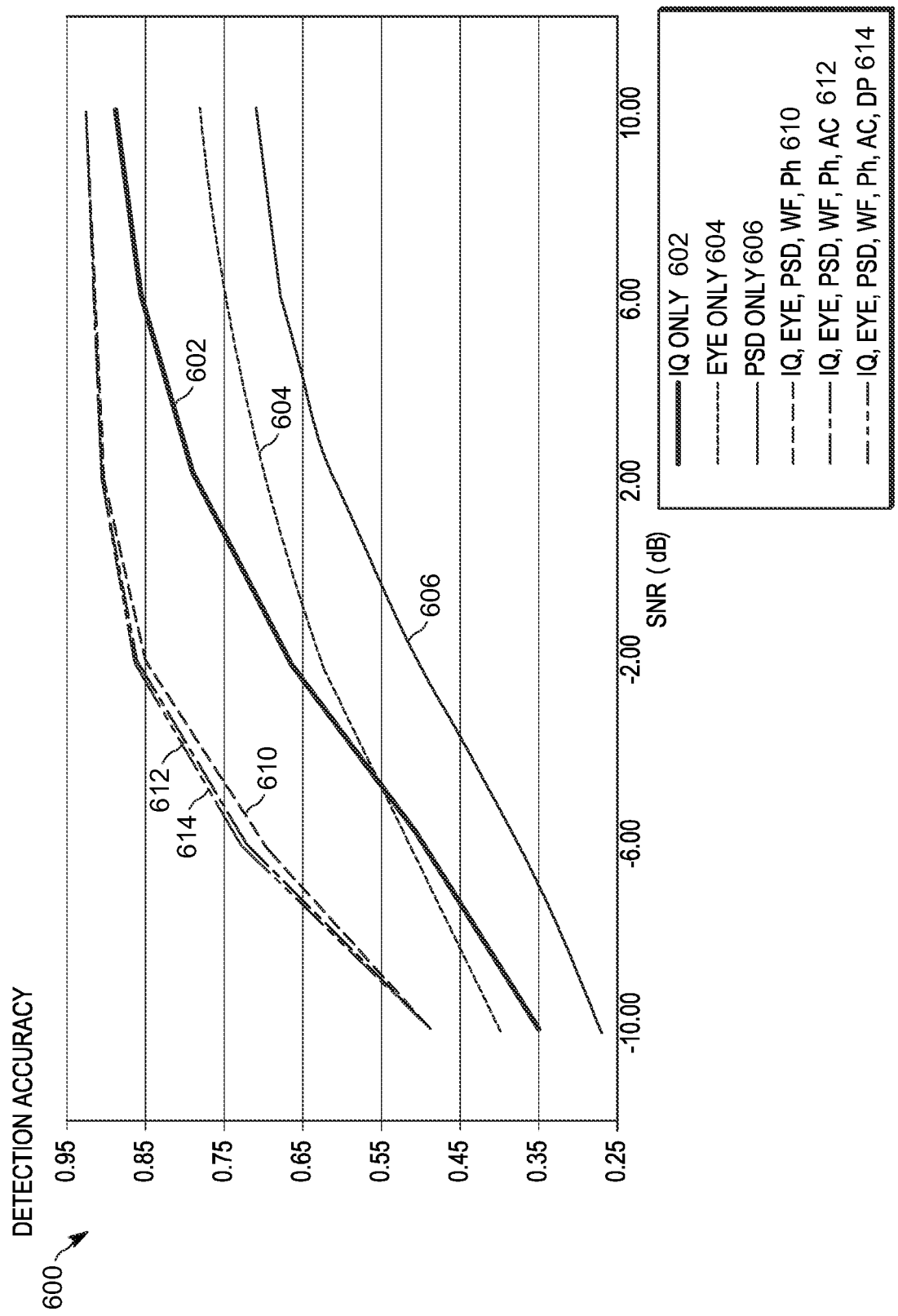
FIG. 6 depicts a graph illustrating the accuracy of modulation classification with respect to signal-to-noise ratio using different data representations and combinations thereof, in accordance with some embodiments

FIG. 6 depicts a graph 600 illustrating the accuracy of modulation classification with respect to signal-to-noise ratio using different data representations and combinations thereof, in accordance with some embodiments. More specifically, graph 600 illustrates the accuracy of modulation classification using seven different data representations either alone or in various combinations.

For example, line 602 illustrates the accuracy of modulation classification when using raw or filtered IQ data alone as an input to a deep neural network. In the illustrated example, line 604 illustrates the accuracy of modulation classification when using an eye diagram representation alone as the input to a deep neural network, and line 606 illustrates the accuracy of modulation classification when using a power spectral density representation alone as the input to a deep neural network.

In addition, line 610 illustrates the accuracy of modulation classification when using a combination of raw or filtered IQ data, an eye diagram representation, a power spectral density representation, a spectrogram PSD, or waterfall, representation, and a phase representation as inputs to respective parallel neural networks of a consolidated neural network, line 612 illustrates the accuracy of modulation classification when using a combination of raw or filtered IQ data, an eye diagram representation, a power spectral density representation, a spectrogram PSD, or waterfall, representation, a phase representation, and an autocorrelation representation as inputs to respective parallel neural networks of a consolidated neural network, and line 614 illustrates the accuracy of modulation classification when using a combination of raw or filtered IQ data, an eye diagram representation, a power spectral density representation, a spectrogram PSD, or waterfall, representation, a phase representation, an autocorrelation representation, and a differentiation representation as inputs to respective parallel neural networks of a consolidated neural network.

As illustrated in FIG. 6, in these experiments, modulation classification performance for baseband signals derived from radio frequency signals improved when multiple data representations were input to a deep neural network. In these experiments, improvements were observed across a range of signal-to-noise ratio (SNR) levels and modulations, with gains for individual modulation types being dependent on the specific data representations generated and the SNR level. The observed accuracy gains ranged from 5% to 30% depending on these variables. The improvements were most pronounced for the lowest-quality input signals.

Experiments have shown that further improvements in modulation classification performance may be possible by forming an ensemble of diverse networks using multiple and single representations, as described herein. For example, logloss performance gains of up to 8% were observed when creating ensemble neural networks using both multiple data representation and single data representation models when the objective function of the ensemble neural network included optimization of a categorical cross entropy loss function.

In various embodiments, the techniques described herein for classifying baseband signals derived from radio frequency signals with respect to modulation type using multiple data representations or for training a consolidated neural network to perform such classifications may be implemented by a modulation classification processing unit of a base station or a mobile station. In other embodiments, these techniques may be implemented by a modulation classification processing unit of another type of device, outside of the context of a base station or mobile station, that is configured to receive and classify baseband signals derived from radio frequency signals or to receive radio frequency signals from which baseband signals can be derived and those baseband signals subsequently classified.

Figure 7:
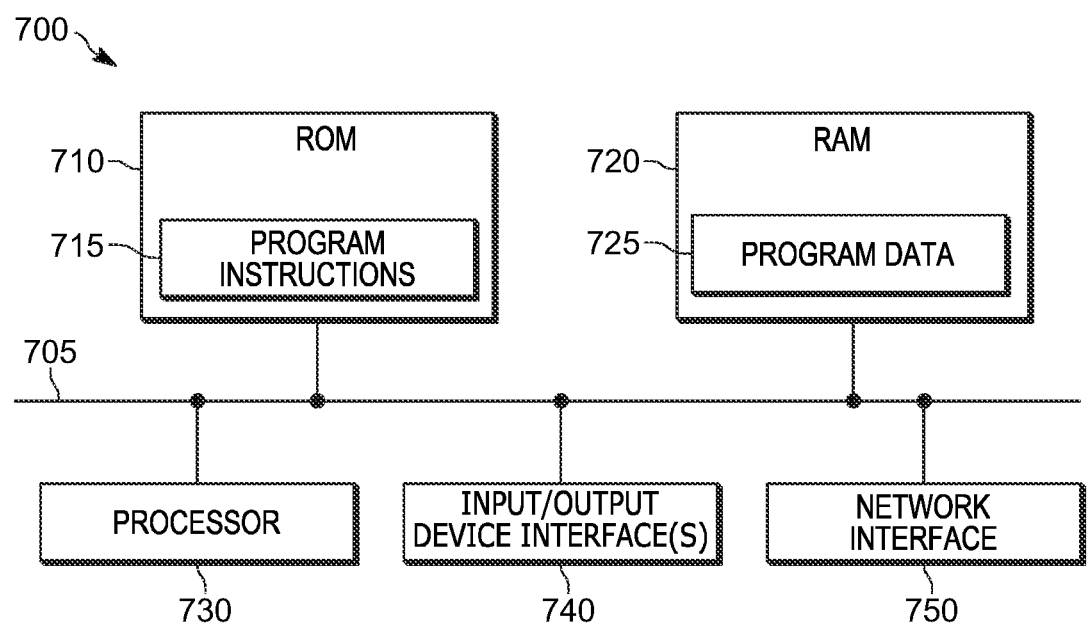
FIG. 7 is a block diagram illustrating selected elements of a modulation classification processing unit configured for classifying baseband signals derived from radio frequency signals with respect to modulation type and for training a consolidated neural network to perform such classifications, in accordance with some embodiments.

FIG. 7 is a block diagram illustrating selected elements of a modulation classification processing unit 700 configured for classifying baseband signals derived from radio frequency signals with respect to modulation type using multiple data representations and for training a consolidated neural network to perform such classifications, in accordance with some embodiments. In some embodiments, modulation classification processing unit 700 may be similar to modulation classification processing unit 130 illustrated in FIG. 1. In the illustrated example, modulation classification processing unit 700 includes a Read Only Memory (ROM) 710, a Random Access Memory (RAM) 720, an electronic processor 730, one or more input/output device interfaces 740 for communicating with locally attached devices and components, and a network interface 750 for communicating with a remote server or device (not shown in FIG. 7), all of which are coupled to a system bus 705 through which they communicate with each other. In various embodiments, the electronic processor 730 may include a microprocessor, a graphics processing unit, a microcontroller, a system-on-chip, a field-programmable gate array, a programmable mixed-signal array, or, in general, any system or sub-system that includes nominal memory and that is capable of executing a sequence of instructions in order to control hardware.

In the illustrated embodiment, ROM 710 stores program instructions 715, at least some of which may be executed by the electronic processor 730 to perform the methods described herein. Modulation classification processing unit 700 may thus be configured to implement a consolidated neural network or ensemble neural network, as described herein, including a pre-processing stage for generating multiple data representations of received complex quadrature vectors, an analysis stage including a plurality of parallel neural networks, and a concatenation stage for generating a classification result based on output of the parallel neural networks. In some embodiments, modulation classification processing unit 700 may also be configured to implement a filtering stage of the consolidated neural network. In other embodiments, a filtering stage for the consolidated neural network may be implemented by filters outside of modulation classification processing unit 700, such as filters 125 shown in FIG. 1. In various embodiments, any or all of the operations of method 400 illustrated in FIG. 4 or method 500 illustrated in FIG. 5 may be performed by program instructions 715 executing on electronic processor 730 of modulation classification processing unit 700.

For example, program instructions 715 may, when executed by electronic processor 730, be operable to receive, at a consolidated neural network whose objective is modulation classification performance, a complex quadrature vector of interest including a plurality of samples of a baseband signal derived from a radio frequency signal of an unknown modulation type, generate a plurality of different data representations of the complex quadrature vector of interest, provide each data representation of the complex quadrature vector of interest to a respective one of a plurality of parallel neural networks of the consolidated neural network, and receive, from the consolidated neural network, a classification result for the baseband signal.

In another example, program instructions 715 may, when executed by electronic processor 730, be operable to receive a plurality of complex quadrature training vectors and, for each of the complex quadrature training vectors, generate a plurality of different data representations of the complex quadrature training vector, provide each data representation of the complex quadrature training vector to a respective one of the plurality of parallel neural networks of the consolidated neural network, receive a classification result for the complex quadrature training vector with respect to the plurality of known modulation types, compare the classification result for the complex quadrature training vector with the known modulation type of the baseband signal for which a plurality of samples is included in the complex quadrature training vector, determine modulation classification performance of the consolidated neural network dependent on the comparison, and modify a configuration parameter of the consolidated neural network dependent on the determined modulation classification performance.

In some embodiments, program instructions 715 may be stored in another type of non-volatile memory, such as a hard disk, a CD-ROM, an optical storage device, a magnetic storage device, a PROM (Programmable Read Only Memory), an EPROM (Erasable Programmable Read Only Memory), an EEPROM (Electrically Erasable Programmable Read Only Memory) or a Flash memory. In some embodiments, program instructions 715 may include program instructions that when executed by electronic processor 730 implement other functionality features of a base station, mobile station, or other device configured to receive and, in some cases, transmit baseband signals derived from radio frequency signals or radio frequency signals from which baseband signals are derived, in addition to program instructions that, when executed, cause the electronic processor 730 to classify baseband signals with respect to modulation type or to train a consolidated neural network to perform such classifications. For example, in some embodiments, program instructions 715 may, when executed by electronic processor 730, be operable to perform encoding signals to be transmitted or decoding received signals.

In this example embodiment, RAM 720 may, from time to time, store program data 725 including, without limitation, configuration information for a consolidated neural network or an ensemble neural network, including information indicating the number of different data representations to be used in a classification or training exercise, the specific combinations of data representations to be used in a classification or training exercise, respective weightings on the outputs of parallel neural networks in the consolidated neural network or ensemble neural network, the number, type, or configuration of neural network layers or other elements included in each of the parallel neural networks in the consolidated neural network or ensemble neural network, or other data accessible by program instruction 715 and used in performing the methods described herein. Certain elements of this program data may, in various embodiments and at different times, represent initial, default, or learned configuration information for the consolidated neural network or ensemble neural network.

In some embodiments, RAM 720 may also store data used in performing other functions of the modulation classification processing unit 700. In some embodiments, RAM 720 may, from time to time, store local copies of all or a portion of program instructions 715 or other program instructions copied from ROM 710 or received over network interface 750.

In this example embodiment, input/output device interfaces 740 may include one or more analog input interfaces, such as one or more analog-to-digital (A/D) convertors, or digital interfaces for receiving signals or data from, and sending signals or data to, one or more input/output devices. In some embodiments, may include one or more analog input interfaces for receiving baseband or radio frequency signals. In some embodiments, input/output device interfaces 740 may include one or more external memory interfaces through which modulation classification processing unit 700 may be coupled to an external memory (not shown in FIG. 7). Such an external memory may include, for example, a hard-disk drive (HDD), an optical disk drive such as a compact disk (CD) drive or digital versatile disk (DVD) drive, a solid-state drive (SSD), a tape drive, a flash memory drive, or a tape drive, to name a few. In various embodiments, or at certain times, some or all of program data 725 may reside in external memory rather than, or in addition to, within RAM 720.

In various embodiments, input/output device interfaces 740 may operate to receive user input, to provide system output, or a combination of both. User input may be provided via, for example, a keyboard or keypad, a microphone, soft keys, icons, or soft buttons on a touch screen of a display, such as display 145 illustrated in FIG. 1, a scroll ball, a mouse, buttons, and the like. Input/output device interfaces 740 may also include other input mechanisms, which for brevity are not described herein and which may be implemented in hardware, software, or a combination of both. In some embodiments, input/output device interfaces 740 may include a graphical user interface (GUI) generated, for example, by electronic processor 730 from program instructions 715 and program data 725 and presented on display 145, enabling a user to interact with display 145.

Network interface 750 may be a suitable system, apparatus, or device operable to serve as an interface between electronic processor 730 and a network. Network interface 750 may enable modulation classification processing unit 700 to communicate over a network using a suitable transmission protocol or standard, including, but not limited to, transmission protocols and standards enumerated below with respect to the discussion of the network. In some embodiments, network interface 750 may be communicatively coupled via a network to a network storage resource. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data or messages, which are generally referred to as data. The network may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network and its various components may be implemented using hardware, software, or any combination thereof.

Network interface 750 may enable wired or wireless communications to and from modulation classification processing unit 700 and other elements of a base station, mobile station, or other device configured to receive and classify baseband signals derived from radio frequency signals or to receive radio frequency signals from which baseband signals can be derived and those baseband signals subsequently classified. In some embodiments, baseband or radio frequency signals may also or alternatively be received over network interface 750 rather than one of input/output device interfaces 740.

The systems and methods described herein for classifying baseband signals derived from radio frequency signals with respect to modulation type using multiple data representations and for training a consolidated neural network to perform such classifications may provide technical benefits over conventional techniques for modulation classification. For example, the use of multiple data representations of a baseband signal as inputs to a consolidated or ensemble neural network has been shown to improve modulation classification performance for a variety of modulation types and for input signals of varying quality.

In at least some embodiments, rather than relying on a neural network to learn, from scratch, to transform raw or filtered IQ vector inputs into particular data representations and to learn the respective neural network architectures to which each data representation should be applied in order to optimize modulation classification, some domain knowledge may be provided to simplify the problem and to make it performant in a production type environment. For example, a collection of candidate data transformations and representations may be identified by those with RF domain expertise as being likely to contribute to an accurate modulation classification for baseband signals in a particular application or domain. Automatically generating and applying various ones of these data representations individually and collectively may provide a boost in the effort to train a consolidated or ensemble neural network whose objective function is modulation classification performance.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors, or "processing devices", such as microprocessors, GPUs, digital signal processors, customized processors and field programmable gate arrays (FPGAs) and unique stored program instructions, including both software and firmware, that control the one or more processors to implement, in conjunction with certain non-processor circuits, some, most, or all of the functions of the method or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer including for example, a processor, to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for classifying radio frequency signal modulations, comprising:
   receiving, at a consolidated neural network, a complex quadrature vector of interest representative of a baseband signal derived from a radio frequency signal;
   generating a plurality of different data representations of the complex quadrature vector of interest;
   providing each data representation of the complex quadrature vector of interest to a respective one of a plurality of parallel neural networks of the consolidated neural network; and
   receiving, from the consolidated neural network, a classification result for the baseband signal derived from the radio frequency signal.

2. The method of claim 1, wherein the classification result for the baseband signal derived from the radio frequency signal is indicative of a modulation type.

3. The method of claim 1, wherein the complex quadrature vector of interest comprises a plurality of samples of the baseband signal derived from the radio frequency signal, each sample comprising real and imaginary parts of the baseband signal of an unknown modulation type in the complex plane.

4. The method of claim 1, wherein the classification result for the baseband signal derived from the radio frequency signal comprises a final output vector in which each element of the final output vector indicates a probability that an unknown modulation type associated with the baseband signal is a respective one of a plurality of known modulation types.

5. The method of claim 1, wherein the classification result for the baseband signal derived from the radio frequency signal comprises a final output vector produced by combining a plurality of feature maps for the plurality of parallel neural networks of the consolidated neural network.

6. The method of claim 1, wherein one or more of the data representations provided to one or more of the plurality of parallel neural networks represents real and imaginary parts of the baseband signal derived from the radio frequency signal.

7. The method of claim 1, further comprising, prior to receiving the complex quadrature vector of interest, training the consolidated neural network to classify baseband signals derived from radio frequency signals with respect to a plurality of known modulation types, the training including:
   receiving a plurality of complex quadrature training vectors, each complex quadrature training vector including a plurality of samples of a baseband signal derived from a radio frequency signal of a respective one of a plurality of known modulation types;
   for each of the plurality of complex quadrature training vectors:
      adding Gaussian noise to the plurality of samples of the baseband signal derived from the radio frequency signal of the respective one of the plurality of known modulation types, the plurality of samples included in the complex quadrature training vector;
      generating a plurality of different data representations of the complex quadrature training vector;
      providing each data representation of the complex quadrature training vector to a respective one of the plurality of parallel neural networks of the consolidated neural network;
      receiving, as an output of the consolidated neural network, a classification result for the complex quadrature training vector with respect to the plurality of known modulation types;
      comparing the classification result for the complex quadrature training vector with the known modulation type of the baseband signal for which a plurality of samples is included in the complex quadrature training vector;
      determining modulation classification performance of the consolidated neural network dependent on the comparing; and
      modifying a configuration parameter of the consolidated neural network dependent on the determined modulation classification performance of the consolidated neural network.

8. The method of claim 1, further comprising, prior to receiving the complex quadrature vector of interest, training the consolidated neural network to classify baseband signals derived from radio frequency signals with respect to a plurality of known modulation types, the training including:

receiving a plurality of complex quadrature training vectors, each complex quadrature training vector including a plurality of samples of a baseband signal derived from a radio frequency signal of a respective one of a plurality of known modulation types;
corrupting the plurality of complex quadrature training vectors;
for each of the plurality of complex quadrature training vectors:
generating a plurality of different data representations of the complex quadrature training vector;
providing each data representation of the complex quadrature training vector to a respective one of the plurality of parallel neural networks of the consolidated neural network;
receiving, as an output of the consolidated neural network, a classification result for the complex quadrature training vector with respect to the plurality of known modulation types;
comparing the classification result for the complex quadrature training vector with the known modulation type of the baseband signal for which a plurality of samples is included in the complex quadrature training vector;
determining modulation classification performance of the consolidated neural network dependent on the comparing; and
modifying a configuration parameter of the consolidated neural network dependent on the determined modulation classification performance of the consolidated neural network.

9. The method of claim 1, wherein each of the plurality of parallel neural networks of the consolidated neural network comprises one or more of a residual neural network, a convolutional layer, a pooling layer, concatenation layer, and a fully connected layer.

10. The method of claim 8, wherein the configuration parameter of the consolidated neural network includes a weighting for an output of one of the plurality of parallel neural networks of the consolidated neural network.

11. The method of claim 8, wherein the corrupting of the plurality of complex quadrature training vectors comprises corrupting one or more of the plurality of samples of the baseband signal derived from the radio frequency signal of the respective one of the plurality of known modulation types, the plurality of samples included in each of the complex quadrature training vectors.

12. The method of claim 11, wherein the corrupting of the one or more of the plurality of samples of the baseband signal derived from the radio frequency signal of the respective one of the plurality of known modulation types comprises injecting radio frequency channel effects into the one or more of the plurality of samples of the baseband signal derived from the radio frequency signal of the respective one of the plurality of known modulation types.

13. A system for classifying radio frequency modulations, comprising:
a consolidated neural network, the consolidated neural network comprising a plurality of parallel neural networks; and
a pre-processing stage configured to:
receive a complex quadrature vector of interest representative of a baseband signal derived from a radio frequency signal;
generate a plurality of different data representations of the complex quadrature vector of interest; and
provide each data representation of the complex quadrature vector of interest to a respective one of the plurality of parallel neural networks of the consolidated neural network;
wherein the consolidated neural network is configured to:
generate, dependent on the data representations of the complex quadrature vector of interest provided to the respective ones of the plurality of parallel neural networks, a classification result for the baseband signal derived from the radio frequency signal.

14. The system of claim 13, wherein the classification result for the baseband signal derived from the radio frequency signal is indicative of a modulation type associated with the baseband signal.

15. The system of claim 13, wherein the complex quadrature vector of interest comprises a plurality of samples of the baseband signal derived from the radio frequency signal, each sample comprising real and imaginary parts of the baseband signal of an unknown modulation type in the complex plane.

16. The system of claim 13, wherein:
each of the plurality of parallel neural networks of the consolidated neural network is configured to output a respective constituent output vector in which each element of the constituent output vector indicates a probability that an unknown modulation type associated with the baseband signal is a respective one of a plurality of known modulation types; and
the system further comprises a concatenation stage configured to:
apply a respective weight to each of the constituent output vectors; and
combine the weighted constituent output vectors to generate a final output vector.

17. The system of claim 13, wherein the classification result for the baseband signal derived from the radio frequency signal comprises a final output vector produced by combining a plurality of feature maps for the plurality of parallel neural networks of the consolidated neural network.

18. The system of claim 13, wherein, prior to receiving the complex quadrature vector of interest:
the pre-processing stage is further configured to:
receive a plurality of complex quadrature training vectors, each complex quadrature training vector including a plurality of samples of a baseband signal derived from a radio frequency signal of a respective one of a plurality of known modulation types; and
for each of the plurality of complex quadrature training vectors:
add Gaussian noise to the plurality of samples of the baseband signal derived from the radio frequency signal of the respective one of the plurality of known modulation types, the plurality of samples included in the complex quadrature training vector;
generate a plurality of different data representations of the complex quadrature training vector; and
provide each data representation of the complex quadrature training vector to a respective one of the plurality of parallel neural networks of the consolidated neural network to train the consolidated neural network for modulation classification with respect to the plurality of known modulation types;
receive, as an output of the consolidated neural network, a classification result for the complex quadrature training vector with respect to the plurality of known modulation types; and the consolidated neural network is further configured to, for each of the plurality of complex quadrature training vectors:
- compare the classification result for the complex quadrature training vector with the known modulation type of the baseband signal for which a plurality of samples is included in the complex quadrature training vector;
- determine modulation classification performance of the consolidated neural network dependent on the comparing; and
- modify a configuration parameter of the consolidated neural network dependent on the determined modulation classification performance of the consolidated neural network.

19. The system of claim 13, wherein, prior to receiving the complex quadrature vector of interest:

the pre-processing stage is further configured to:
- receive a plurality of complex quadrature training vectors, each complex quadrature training vector including a plurality of samples of a baseband signal derived from a radio frequency signal of a respective one of a plurality of known modulation types; and
- corrupt the plurality of complex quadrature training vectors;
- for each of the plurality of complex quadrature training vectors:
  - generate a plurality of different data representations of the complex quadrature training vector; and
  - provide each data representation of the complex quadrature training vector to a respective one of the plurality of parallel neural networks of the consolidated neural network to train the consolidated neural network for modulation classification with respect to the plurality of known modulation types;
  - receive, as an output of the consolidated neural network, a classification result for the complex quadrature training vector with respect to the plurality of known modulation types; and the consolidated neural network is further configured to, for each of the plurality of complex quadrature training vectors:
- compare the classification result for the complex quadrature training vector with the known modulation type of the baseband signal for which a plurality of samples is included in the complex quadrature training vector;
- determine modulation classification performance of the consolidated neural network dependent on the comparing; and
- modify a configuration parameter of the consolidated neural network dependent on the determined modulation classification performance of the consolidated neural network.

20. The system of claim 19, wherein the corrupting of the plurality of complex quadrature training vectors comprises corrupting one or more of the plurality of samples of the baseband signal derived from the radio frequency signal of the respective one of the plurality of known modulation types, the plurality of samples included in each of the complex quadrature training vectors.

* * * * *